(12) United States Patent
Komaki et al.

(10) Patent No.: US 12,534,377 B2
(45) Date of Patent: Jan. 27, 2026

(54) CARBON-CONTAINING ALUMINA POWDER, RESIN COMPOSITION, HEAT DISSIPATION COMPONENT, AND METHOD FOR PRODUCING CARBON-CONTAINING ALUMINA POWDER

(71) Applicant: DENKA COMPANY LIMITED, Tokyo (JP)

(72) Inventors: Takafumi Komaki, Tokyo (JP); Junya Nitta, Tokyo (JP); Yoshiaki Okamoto, Tokyo (JP); Masakazu Hirata, Tokyo (JP); Genta Karino, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 642 days.

(21) Appl. No.: 17/915,368

(22) PCT Filed: Mar. 24, 2021

(86) PCT No.: PCT/JP2021/012295
§ 371 (c)(1),
(2) Date: Sep. 28, 2022

(87) PCT Pub. No.: WO2021/200486
PCT Pub. Date: Oct. 7, 2021

(65) Prior Publication Data
US 2023/0150830 A1 May 18, 2023

(30) Foreign Application Priority Data
Mar. 31, 2020 (JP) .................................. 2020-064175

(51) Int. Cl.
| | |
|---|---|
| C01F 7/00 | (2022.01) |
| C01F 7/02 | (2022.01) |
| C08K 3/22 | (2006.01) |
| H05K 7/20 | (2006.01) |

(52) U.S. Cl.
CPC .................. *C01F 7/02* (2013.01); *C08K 3/22* (2013.01); *C01P 2004/32* (2013.01); *C01P 2006/12* (2013.01); *C01P 2006/80* (2013.01); *C08K 2003/2227* (2013.01); *H05K 7/2039* (2013.01)

(58) Field of Classification Search
None
See application file for complete search history.

(56) References Cited

U.S. PATENT DOCUMENTS

| | | | | |
|---|---|---|---|---|
| 4,101,615 | A | * | 7/1978 | Horikiri ............ C04B 35/62236 264/627 |
| 6,169,142 | B1 | | 1/2001 | Nakano et al. |
| 2003/0162116 | A1 | * | 8/2003 | Katsuta .............. G03G 9/08793 430/108.4 |
| 2016/0340496 | A1 | | 11/2016 | Loscutova et al. |
| 2017/0210886 | A1 | * | 7/2017 | Ikeda ........................ C08K 9/06 |
| 2022/0216510 | A1 | * | 7/2022 | Kanai ..................... C04B 35/50 |

FOREIGN PATENT DOCUMENTS

| | | |
|---|---|---|
| JP | H09-296114 A | 11/1997 |
| JP | H11-209618 A | 8/1999 |
| JP | 2000-001616 A | 1/2000 |
| JP | 2003-201116 A | 7/2003 |
| JP | 2012-020900 A | 2/2012 |
| JP | 2014-122364 A | 7/2014 |
| JP | 2017-508701 A | 3/2017 |
| JP | 2018-095496 A | 6/2018 |
| TW | 201609549 A | 3/2016 |
| WO | 2016/017637 A1 | 2/2016 |

OTHER PUBLICATIONS

Jun. 1, 2021 Search Report issued in International Patent Application No. PCT/JP2021/012295.
Sep. 29, 2022 International Preliminary Report on Patentability issued in International Patent Application No. PCT/JP2021/012295.

* cited by examiner

*Primary Examiner* — Stefanie J Cohen
(74) *Attorney, Agent, or Firm* — Oliff PLC

(57) ABSTRACT

A carbon-containing alumina powder containing a carbon-containing alumina particle having a projected area equivalent circle diameter of 1 μm or more and 100 μm or less as determined by microscopy, wherein an average sphericity of the carbon-containing alumina particle is 0.85 or more, and a specific surface area is 0.05 m²/g or more and 1.0 m²/g or less, and a ratio B/A of a carbon content ratio B to a carbon content ratio A in the carbon-containing alumina powder calculated by using a specific measurement method is 0.20 or more and 0.90 or less.

9 Claims, No Drawings

CARBON-CONTAINING ALUMINA POWDER, RESIN COMPOSITION, HEAT DISSIPATION COMPONENT, AND METHOD FOR PRODUCING CARBON-CONTAINING ALUMINA POWDER

TECHNICAL FIELD

The present invention relates to a carbon-containing alumina powder, a resin composition, a heat dissipation component, and a method for producing the carbon-containing alumina powder.

BACKGROUND ART

In recent years, with the progress of miniaturization and high functionality of a heat-generating electronic component such as an IC and an MPU, the amount of heat generated by an electronic device mounted with an electronic component has increased, and an efficient heat dissipation method has still been expected to be developed. In order to dissipate heat from an electronic device, a heat sink is attached to a board on which a heat-generating electronic component is mounted, or when the space for attaching the heat sink cannot be secured, for example, the board is attached directly to the metal chassis of the electronic device. At this time, a heat sink is attached via a heat dissipation component such as a sheet formed by filling silicone rubber with an inorganic powder having good electrical insulation and thermal conductivity, for example, an inorganic powder such as a boron nitride powder, an aluminum nitride powder, or an alumina powder, or a flexible sheet having an Asker C hardness of 25 or less (for example, Patent Document 1).

The quality of heat dissipation in a resin composition after forming and processing greatly depends on the thermal conductivity of the resin composition and the close adhesion to an adherend (shape conformability) after forming and processing, and is also affected by the presence or absence of a void (air layer) included in the resin composition. The thermal conductivity is secured by filling with an inorganic powder in a high proportion, but when a resin or the like is filled with an inorganic powder in a high proportion, the fluidity of the resin composition before forming and processing decreases very much, and thus the formability and processability is impaired and the close adhesion remarkably decreases. On the other hand, as the viscosity of the resin composition before forming and processing increases, it becomes difficult to remove the void included, and thus the thermal conductivity also decreases. Therefore, as a method for holding the filling ratio of an inorganic powder to some extent, achieving both the fluidity and the high thermal conductivity of a resin composition before forming and processing, and not greatly impairing the formability and processability or the close adhesion, use of a spherical alumina powder and an alkoxysilane compound has been proposed (for example, Patent Document 2).

In addition, highly filling with the inorganic powder not only impairs the fluidity of the resin composition before forming and processing, but also remarkably lowers the heat resistance reliability of a mechanical property of the resin composition after forming and processing, such as an increase in compression set and a decrease in tensile strength in the resin composition after forming and processing. As a method for improving the heat resistance reliability of a mechanical property, it has been proposed to treat the surface of an inorganic powder with an alkoxysilane compound having a long-chain alkyl group (for example, Patent Document 3).

CITATION LIST

Patent Document

Patent Document 1: Japanese Patent Laid-Open No. 9-296114
Patent Document 2: Japanese Patent Laid-Open No. 2000-1616
Patent Document 3: Japanese Patent Laid-Open No. 11-209618

SUMMARY OF INVENTION

Technical Problem

However, the spherical alumina powder surface-treated with the alkoxysilane compound has a large specific surface area, has a low average sphericity, includes a distorted shape, and the like, and because of these reasons, this spherical alumina powder has the following problem: when a resin is filled with the spherical alumina powder, thickening occurs and it is difficult to highly fill the resin with the alumina particle. Because of this, the formability is low, and the thermal conductivity of the heat dissipation component obtained is also low.

In addition, the formed article obtained by filling a resin with the spherical alumina powder is low in tackiness and thus has the following problem: the close adhesion (shape conformability) to an adherend is not sufficient.

The present invention has been made in view of such a problem, and an object thereof is to provide a carbon-containing alumina powder that can suppress an increase in viscosity when a resin is filled therewith and realize high thermal conductivity of a resin composition including the resin, and a resin composition and a heat dissipation component including the carbon-containing alumina powder.

Solution to Problem

The present inventors have carried out diligent and extensive research to achieve the above object, and as a result, have found that by using a carbon-containing alumina powder including a specific carbon-containing alumina particle, when a resin is filled therewith, an increase in viscosity can be suppressed, high thermal conductivity of a resin composition including the resin can be realized, and the close adhesion of the resin composition to an adherend can be improved, and have completed the present invention.

That is, the present invention is as follows.

[1] A carbon-containing alumina powder containing a carbon-containing alumina particle having a projected area equivalent circle diameter of 1 μm or more and 100 or less as determined by microscopy, wherein an average sphericity of the carbon-containing alumina particle is 0.85 or more, and a specific surface area is 0.05 m$^2$/g or more and 1.0 m$^2$/g or less, and a ratio B/A of a carbon content ratio B to a carbon content ratio A in the carbon-containing alumina powder calculated by using the following measurement method is 0.20 or more and 0.90 or less:

(Measurement Method)

The ratio B/A is calculated by using the carbon content ratio A in the carbon-containing alumina powder, and the carbon content ratio B in the alumina powder after 3 g of the carbon-containing alumina powder is cleaned twice using 50 mL of acetone at room temperature for 5 minutes each and held at 100° C. for 240 minutes, wherein each of the carbon content ratio A and the carbon content ratio B is a value measured using a carbon/sulfur simultaneous analyzer.

[2] The carbon-containing alumina powder according to [1], wherein the carbon-containing alumina powder contains a silicon atom and a carbon atom, and a ratio MSi/MC of a mass MSi of the silicon atom to a mass MC of the carbon atom is 0.1 or more and 1.2 or less.

[3] A resin composition containing a resin and the carbon-containing alumina powder according to [1] or [2].

[4] A heat dissipation component containing the carbon-containing alumina powder according to [1] or [2], or the resin composition according to [3].

[5] A method for producing the carbon-containing alumina powder according to [1] or [2], the method containing: a step of mixing an alkoxysilane compound and an alumina powder; and a step of heating these at a relative humidity at room temperature of 20% or more and 60% or less, a temperature of 100° C. or more and 150° C. or less, and a heating time of 0.5 hours or more and 1.5 hours or less.

Advantageous Effects of Invention

According to the present invention, a carbon-containing alumina powder that can suppress an increase in viscosity when a resin is filled therewith and realize high thermal conductivity of a resin composition including the resin, and a resin composition and a heat dissipation component including the carbon-containing alumina powder can be provided.

DESCRIPTION OF EMBODIMENT

Hereinafter, an embodiment for practicing the present invention (hereinafter, simply referred to as "the present embodiment") will be described in detail. The following embodiment is an illustration for describing the present invention, and the present invention is not limited only to the present embodiment.

The alumina powder of the present embodiment includes a specific carbon-containing alumina particle.
[Carbon-Containing Alumina Powder]
(Carbon-Containing Alumina Particle)

The carbon-containing alumina particle according to the present embodiment is not particularly limited as long as it is an alumina particle containing carbon that has a projected area equivalent circle diameter as determined by microscopy, an average sphericity, and a specific surface area within their respective ranges as described later. The carbon-containing alumina particle can be obtained, for example, by treating the surface of an alumina particle with an alkoxysilane compound under a specific condition.

Common examples of the alkoxysilane compound include four types of alkoxysilane compounds having 1 to 4 alkoxy groups, and oligomers obtained by condensing these. Examples of the four types of alkoxysilane compounds include a tetraalkoxysilane compound, a trialkoxysilane compound, a dialkoxysilane compound, and a monoalkoxysilane compound, and those in which a hydrogen atom is not directly bonded to a silicon atom are preferable. One of these alkoxysilane compounds can be used alone or two or more thereof can be appropriately mixed and used.

Examples of the tetraalkoxysilane compound include tetramethoxysilane, tetraethoxysilane, tetrapropoxysilane, tetraisopropoxysilane, and tetrabutoxysilane.

Examples of the trialkoxysilane compound can include methyltrimethoxysilane, methyltriethoxysilane, methyltripropoxysilane, methyltributoxysilane, methyltriphenoxysilane, ethyltrimethoxysilane, ethyltriethoxysilane, propyltrimethoxysilane, butyltrimethoxysilane, butyltriethoxysilane, hexyltrimethoxysilane, hexyltriethoxysilane, octyltrimethoxysilane, octyltriethoxysilane, decyltrimethoxysilane, decyltriethoxysilane, phenyltrimethoxysilane, phenyltriethoxysilane, vinyltrimethoxysilane, vinyltriethoxysilane, vinyltris(2-methoxyethoxy)silane, N-decyltrimethoxysilane, 3-glycidoxypropyltrimethoxysilane, 3-glycidoxypropyltriethoxysilane, 3,4-epoxycyclohexylethyltrimethoxysilane, 3,4-epoxycyclohexylethyltriethoxysilane, 3-methacryloxypropyltrimethoxysilane, 3-methacryloxypropyltriethoxysilane, 3-acryloxypropyltrimethoxysilane, 3-mercaptopropyltrimethoxysilane, and 3-mercaptopropyltriethoxysilane.

Examples of the dialkoxysilane compound include dimethyldimethoxysilane, dimethyldiethoxysilane, dimethyldipropoxysilane, dibutyldimethoxysilane, dipropyldimethoxysilane, phenylmethyldimethoxysilane, phenylmethyldiethoxysilane, diphenyldimethoxysilane, diphenyldiethoxysilane, cyclohexylmethyldimethoxysilane, and vinylmethyldimethoxysilane.

Examples of the monoalkoxysilane compound include trimethylmethoxysilane, triethylmethoxysilane, triphenylmethoxysilane, diethylvinylmethoxysilane, dimethylpropylmethoxysilane, dimethylphenylmethoxysilane, diphenylmethylmethoxysilane, trimethylethoxysilane, triethylethoxysilane, triphenylethoxysilane, dimethylvinylethoxysilane, dimethylpropylethoxysilane, and dimethylphenylethoxysilane.

If the carbon-containing alumina particle according to the present embodiment is spherical, when a resin is filled with the alumina powder, thickening is unlikely to occur, and thus the resin can be highly filled, and therefore the projected area equivalent circle diameter as determined by microscopy is 1 µm or more and 100 µm or less, and the average sphericity is 0.85 or more. The average sphericity is preferably 0.85 or more and 0.99 or less. When the average sphericity is in the above range, the fluidity of the carbon-containing alumina particle in the resin can be further improved, and the increase in viscosity when the resin is filled with the carbon-containing alumina powder can be suppressed. In addition, as a result of more sufficient contact between the alumina particles and a larger contact area, it tends to be possible to obtain a resin composition and a heat dissipation component having higher thermal conductivity, and the alumina particle tends to be unlikely to fall off from the resin. The average sphericity is measured by the following microscopy. That is, a particle image taken using a scanning electron microscope, a transmission electron microscope, or the like is taken into an image analyzer, and the projected area (SA) and the perimeter (PM) of the particle are measured from the photograph. When the area of a perfect circle having the same perimeter as the perimeter (PM) is (SB), the sphericity of the particle is SA/SB. Therefore, when envisioning a perfect circle having the same perimeter as the perimeter (PM) of a sample, $PM=2\pi r$ and $SB=\pi r^2$, and thus $SB=\pi \times (PM/2\pi)^2$, and the sphericity of each particle is sphericity=$SA/SB=SA \times 4\pi/(PM)^2$. The sphericity of each of 200 arbitrary particles having a projected area equivalent circle diameter of 1 µm or more and 100 µm or less is determined as described above, and the arithmetic mean value thereof is taken as the average sphericity. A specific measurement method is as described in the Examples. In addition, the projected area equivalent circle diameter refers to the diameter of a perfect circle having the same projected area as the projected area (SA) of a particle.

The specific surface area of the carbon-containing alumina particle according to the present embodiment is, from the viewpoint of obtaining a resin composition and a heat dissipation material in which the contact resistance at the interface with a resin is low and an increase in viscosity is more unlikely to occur, 0.05 m$^2$/g or more and 1.0 m$^2$/g or less and preferably 0.1 m$^2$/g or more and 0.6 m$^2$/g or less. In the present embodiment, the specific surface area is measured by the BET flow method, and a specific measurement method is as described in the Examples.

(Carbon-Containing Alumina Powder)

In the carbon-containing alumina powder according to the present embodiment, the ratio B/A calculated by using the following measurement method is 0.20 or more and 0.90 or less. When the ratio B/A is 0.20 or more, the following effect can be obtained: a substance including carbon such as a surface treatment agent remaining in the carbon-containing alumina powder suppresses bleeding from the resin composition or the heat dissipation component. On the other hand, when the ratio B/A is 0.90 or less, the following effect can be obtained: thickening is unlikely to occur when the resin is filled, and the forming and processing is easy. (Measurement method)

The ratio B/A is calculated by using the carbon content ratio A in the carbon-containing alumina powder according to the present embodiment, and the carbon content ratio B in the alumina powder after 3 g of the carbon-containing alumina powder is cleaned twice using 50 mL of acetone at room temperature for 5 minutes each and held at 100° C. for 240 minutes. Each of the carbon content ratio A and the carbon content ratio B is a value measured using a carbon/sulfur simultaneous analyzer. A specific measurement method is as described in the Examples.

When the carbon-containing alumina powder according to the present embodiment satisfies the above range of the ratio B/A, an increase in viscosity can be suppressed when the resin is filled with the carbon-containing alumina powder, and a resin composition and a heat dissipation component having good close adhesion to an adherend can be obtained. The reason for this is not clear, but the present inventors presume as follows.

The fact that the ratio B/A is 0.20 or more means that a substance including carbon (for example, an alkoxysilane compound) in a predetermined proportion or more is firmly fixed on the surface of the carbon-containing alumina particle in the carbon-containing alumina powder, for example, by a chemical bond. In this case, it is considered that the firmly fixed substance including carbon contributes to the close adhesion to the adherend, and thereby a resin composition and a heat dissipation component having good close adhesion thereto can be obtained. On the other hand, the fact that the ratio B/A is 0.90 or less means that a substance including carbon (for example, an alkoxysilane compound) in a predetermined ratio or less is present in the carbon-containing alumina powder in a state in which the substance can be easily removed. It is presumed that such a substance including carbon can improve the fluidity between the resin and the carbon-containing alumina particle and suppress an increase in viscosity when the resin is filled.

For example, if the substance including carbon is an alkoxysilane compound, when the surface of the alumina particle is treated with the alkoxysilane compound, not all of the alkoxysilane compound reacts with the alumina particle, and an unreacted alkoxysilane compound remains. In this case, it is presumed that when the amount of the unreacted alkoxysilane compound remaining is so small that the ratio B/A is 0.20 or more, bleeding of the unreacted alkoxysilane compound from the resin composition is suppressed, and the close adhesion (shape conformability) to the adherend is improved. On the other hand, the alkoxysilane compound remaining contributes to the fluidity between the resin and the carbon-containing alumina powder, and has the effect of improving the close adhesion between the resin and the alumina particle. Because of these, the present inventors consider that it is important for the alkoxysilane compound to remain to some extent. That is, it is presumed that if the amount of the unreacted alkoxysilane compound remaining is so large that the ratio B/A is 0.90 or less, when a resin or the like is highly filled with the carbon-containing alumina powder, the fluidity of the resin composition before forming and processing is improved, the formability and processability is maintained, and the close adhesion is improved.

The ratio B/A calculated by using the above measurement method is preferably 0.20 or more and 0.90 or less, and more preferably 0.30 or more and 0.70 or less from the viewpoint of having better close adhesion and better fluidity between the resin and the carbon-containing alumina powder, and suppressing thickening.

The carbon-containing alumina powder according to the present embodiment includes a silicon atom and a carbon atom, and the ratio MSi/MC of the mass MSi of the silicon atom to the mass MC of the carbon atom (hereinafter, also simply referred to as the "mass ratio") is preferably 0.1 or more and 1.2 or less from the viewpoint of the ratio of fixation of the treatment agent on the alumina surface. The silicon atom and the carbon atom are derived from, for example, the alkoxysilane compound used for the surface treatment of the alumina powder, and may be derived from the alkoxysilane compound reacted with the surface of the alumina powder or the alkoxysilane compound remaining on the surface of the alumina powder. A mass ratio MSi/MC in the above range is preferable from the viewpoint of the ratio of fixation of the treatment agent on the alumina surface. The mass ratio MSi/MC is preferably 0.1 or more and 1.2 or less, and more preferably 0.2 or more and 0.4 or less from the viewpoint of the ratio of fixation of the treatment agent on the alumina surface.

The mass ratio MSi/MC is measured, for example, using an energy dispersive X-ray analyzer (EDX). That is, the mass ratio MSi/MC can be determined from the ratio of the X-ray counts of the Si element and the C element.

(Content Ratio of Carbon-Containing Alumina Particle in Carbon-Containing Alumina Powder)

In the present embodiment, the content ratio of the carbon-containing alumina particle in the carbon-containing alumina powder is preferably 10% by mass or more and more preferably 50% by mass or more from the viewpoint of modifying the surface of the alumina particle. Further preferably, the content ratio may be 70% by mass or more, or 90% by mass or more. The upper limit may be 100% by mass or less, 10% by mass or less, 30% by mass or less, or 50% by mass or less.

[Method for Producing Carbon-Containing Alumina Powder]

The method for producing the carbon-containing alumina powder of the present embodiment includes a step of mixing an alkoxysilane compound and an alumina powder (hereinafter, also referred to as the "mixing step") and a step of heating these at a relative humidity at room temperature of 20% or more and 60% or less, a temperature of 100° C. or more and 150° C. or less, and a heating time of 0.5 hours or more and 1.5 hours or less (hereinafter, also referred to as the "heating step").

(Raw Materials)

As raw materials for obtaining the carbon-containing alumina powder according to the present embodiment, an alkoxysilane compound, an alumina powder, and, as necessary, methanol, ethanol, and water are used.

Examples of the raw material alkoxysilane compound include the above four types of alkoxysilane compounds having 1 to 4 alkoxy groups, and oligomers obtained by condensing these. Among these, a trialkoxysilane compound and a dialkoxysilane compound are preferable from the viewpoint of reacting well with the alumina powder. One of these alkoxysilane compounds can be used alone or two or more thereof can be appropriately mixed and used.

As the raw material alumina powder, a known alumina powder including an alumina particle having an average sphericity of 0.85 or more can be used.

The raw material alumina powder preferably includes an alumina particle having an average particle diameter of 1 μm or more and 100 μm or less. In the present embodiment, the average particle diameter refers to the median diameter (d50) on a volume basis. The average particle diameter of the alumina particle can be measured, for example, using a laser light diffraction scattering particle size distribution analyzer ("Model LS-230" (trade name) manufactured by Beckman Coulter, Inc.). In this case, the measurement solution can be obtained by adding an alumina particle to ethanol and carrying out dispersion treatment for about 1 minute using a known stirrer such as a homogenizer to make an adjustment such that the reading of the concentration adjustment window of the apparatus is 45% or more and 55% or less. The analysis of the particle size distribution is carried out by dividing the range of a particle diameter of 0.04 μm or more and 2000 μm or less into 116 divisions (width of log (μm)=0.04). For details of the measurement method, "laser light diffraction scattering particle size distribution analyzer LS Series" (manufactured by Beckman Coulter, Inc.) or "Measuring Particle Size Distribution" written by Mayumi Toyoda (Academic Team, Particle Physics Division, Beckman Coulter, Inc.) can be referred to.

The raw material alumina powder preferably includes an alumina particle having an average sphericity of 0.85 or more of an alumina particle having a projected area equivalent circle diameter of 1 μm or more and 100 μm or less as determined by microscopy. The average sphericity is preferably 0.90 or more and 0.98 or less from the viewpoint of suppressing thickening when the resin is filled. The average sphericity is measured by the above microscopy, and a specific measurement method is as described in the Examples.

When an alumina particle having low sphericity is included, the sphericity of the carbon-containing alumina powder also decreases, and the thickening tends to occurs when the resin is filled, and thus the proportion of an alumina particle having a sphericity of 0.85 or less of an alumina particle having a projected area equivalent circle diameter of less than 10 μm as determined by the above microscopy is preferably 1.0% or less on a number basis, and more preferably 0.5% or less on a number basis. The lower limit is, for example, 0.1% on a number basis.

The specific surface area of the alumina particle included in the raw material alumina powder is preferably 0.05 $m^2/g$ or more and 1.0 $m^2/g$ or less, and more preferably 0.1 $m^2/g$ or more and 0.5 $m^2/g$ or less from the viewpoint of being able to widen the contact area at the interface with the alkoxysilane compound.

(Production Method)

In the method for producing the carbon-containing alumina powder of the present embodiment, first, in the mixing step, an alkoxysilane compound, an alumina powder, and, as necessary, methanol, ethanol, and water are mixed to obtain a mixed liquid. In the present embodiment, the reaction between the alkoxysilane compound and the alumina powder easily proceeds, and from the viewpoint of suppressing excessive generation of an unreacted alkoxysilane compound, it is preferable to add 0.1 parts by mass or more and 3.0 parts by mass or less, preferably 0.2 parts by mass or more and 1.0 part by mass or less, of a hydrolyzed liquid obtained by dissolving the alkoxysilane compound and, as necessary, methanol, ethanol, and water in a solvent to 100 parts by mass of the alumina powder, and mix these. The solvent is preferably water from the viewpoint of dispersibility, safety, and economy, but may be a flammable liquid such as alcohol or a mixed liquid such as water-alcohol as long as the raw materials can be dispersed. As a mixing method, for example, predetermined amounts of the raw materials and the solvent may be added and mixed using a stirrer or the like until the raw materials are sufficiently dispersed.

Next, in the heating step, the mixed liquid thus obtained is heated at a relative humidity at room temperature (25° C.) of 20% or more and 60% or less, a temperature of 100° C. or more and 150° C. or less, and a heating time of 0.5 hours or more and 1.5 hours or less. Through this step, the alkoxysilane compound reacts with the alumina particle to obtain the carbon-containing alumina powder according to the present embodiment. When the relative humidity is 20% or more, the alkoxysilane compound is hydrolyzed by the water adsorbed on the surface of the alumina particle, and the effect of easily reacting with an OH group on the alumina surface can be obtained. In addition, when the temperature is 100° C. or more, the effect of the reaction easily proceeding can be obtained. Further, when the temperature is 150° C. or less, the boiling point of the alkoxysilane is not reached before the reaction, and the effect of being able to suppress a decrease in the amount reacted can be obtained.

The obtained carbon-containing alumina particle may be used as it is as the carbon-containing alumina powder according to the present embodiment. Alternatively, the carbon-containing alumina powder according to the present embodiment can also be obtained by subjecting the obtained carbon-containing alumina particle to classification treatment, sieving treatment, or the like.

[Resin Composition and Method for Producing the Same]

The resin composition according to the present embodiment includes at least a resin and the carbon-containing alumina powder according to the present embodiment. By including the above carbon-containing alumina powder, the resin composition according to the present embodiment can suppress thickening and has high thermal conductivity, and the close adhesion of a formed article such as a heat dissipation component obtained from the resin composition to an adherend can be improved.

(Resin)

As the resin, various polymer compounds such as a thermoplastic resin and an oligomer thereof and an elastomer can be used, and for example, an epoxy resin, a phenol resin, a melamine resin, a urea resin, an unsaturated polyester, a urethane resin, an acrylic resin, and a fluororesin; a polyamide such as polyimide, polyamideimide, and polyetherimide; a polyester such as polybutylene terephthalate and polyethylene terephthalate; polyphenylene sulfide, aromatic polyester, polysulfone, a liquid crystal polymer, polyether sulfone, a polycarbonate, a maleimide modified resin, ABS (acrylonitrile/butadiene/styrene) resin, AAS (acrylonitrile/acrylic rubber/styrene) resin, AES (acrylonitrile/ethylene/propylene/diene rubber/styrene) resin, EVA (ethylene vinyl acetate copolymer) resin, and a silicone resin can be used. One of these resins can be used alone or two or more thereof can be appropriately mixed and used.

Among these resins, from the viewpoint of heat resistant temperature, strength, and hardness after curing, an epoxy resin, a phenol resin, a urethane resin, an acrylic resin, a fluororesin, polyimide, polyphenylene sulfide, a polycarbonate, ABS resin, and a silicone resin are preferable, a silicone resin, an epoxy resin, a urethane resin, and an acrylic resin are more preferable, and a silicone resin is even more preferable.

As the silicone resin, it is preferable to use a rubber or gel obtained from a one-component or two-component addition reaction type liquid silicone having an organic group such as a methyl group and a phenyl group. Examples of such a rubber or gel include "YE5822A Liquid/YE5822B Liquid" manufactured by Momentive Performance Materials Japan LLC and "SE1885A liquid/SE1885B liquid" manufactured by Dow Corning Toray Co., Ltd.

(Amount of Carbon-Containing Alumina Powder Blended)

In the resin composition of the present embodiment, the content of the carbon-containing alumina powder according to the present embodiment is preferably 30% by mass or more and 97% by mass or less, and more preferably 50% by mass or more and 95% by mass or less based on the total amount of the resin composition from the viewpoint of developing a characteristic of the filler used for filling. The carbon-containing alumina powder according to the present embodiment does not easily thicken even when the resin is filled therewith, and thus even if the carbon-containing alumina powder is included in the resin composition within the above range, the thickening of the resin composition can be suppressed. In addition, when the content of the carbon-containing alumina powder is 50% by mass or more, it tends to be easy to obtain a resin composition and a heat dissipation component that can realize good high thermal conductivity and close adhesion to an adherend, and when the content is 95% by mass or less, the amount of the resin to bind the carbon-containing alumina powder can be secured, and the resin composition can be more suitably used for a heat dissipation component.

In the resin composition of the present embodiment, the content of the resin according to the present embodiment is preferably 3% by mass or more and 70% by mass or less, and more preferably 5% by mass or more and 50% by mass or less based on the total amount of the resin composition from the viewpoint of developing a characteristic of the filler used for filling.

(Other Components)

In addition to the carbon-containing alumina powder and the resin according to the present embodiment, the resin composition of the present embodiment may include, as necessary, an inorganic filler such as fused silica, crystalline silica, zircon, calcium silicate, calcium carbonate, silicon carbide, aluminum nitride, boron nitride, beryllia, and zirconia; a flame retardant compound such as a nitrogen-containing compound such as melamine and benzoguanamine, an oxazine ring-containing compound, and a phosphate compound of a phosphorus-based compound, an aromatic condensed phosphoric acid ester, and a halogen-containing condensed phosphoric acid ester; an additive, or the like, as long as a characteristic of the present embodiment is not impaired. Examples of the additive include a reaction retarder such as dimethyl maleate, a curing agent, a curing accelerator, a flame retardant aid, a flame retardant, a colorant, a tackifier, a UV absorber, an antioxidant, a fluorescent whitener, a photosensitizer, a thickener, a lubricant, an antifoamer, a surface conditioner, a brightener, and a polymerization inhibitor. One of these components can be used alone or two or more thereof can be appropriately mixed and used. In the resin composition of the present embodiment, the content ratio of each of other components is usually 0.1% by mass or more and 5.0% by mass or less.

(Method for Producing Resin Composition)

Examples of a method for producing the resin composition of the present embodiment include a method involving sufficiently stirring the resin, the carbon-containing alumina powder, and, as necessary, another component to obtain the resin composition. The resin composition of the present embodiment can be produced, for example, by blending a predetermined amount of each component using a blender, a Henschel mixer, or the like, then kneading the resulting blend using a heating roll, a kneader, a single screw or twin screw extruder, or the like, cooling the kneaded product, and then pulverizing the same.

[Heat Dissipation Component]

The heat dissipation component according to the present embodiment includes the carbon-containing alumina powder or the resin composition according to the present embodiment. By using the above carbon-containing alumina powder or resin composition, the heat dissipation component according to the present embodiment can realize high thermal conductivity, that is, can have high heat dissipation properties. In addition, by using the above carbon-containing alumina powder or the resin composition, the heat dissipation component according to the present embodiment can improve the close adhesion to an adherend. The content ratio of the carbon-containing alumina powder in the heat dissipation component according to the present embodiment is preferably 30% by volume or more and 85% by volume or less, and more preferably 40% by volume or more and 83% by volume or less from the viewpoint of being able to realize higher thermal conductivity and close adhesion to the adherend. Examples of the heat dissipation component include a heat dissipation sheet, a heat dissipation grease, a heat dissipation spacer, a semiconductor encapsulant, a heat dissipation coating material (heat dissipation coating agent), a heat dissipation potting agent, and a heat dissipation gap filler.

EXAMPLES

Examples and Comparative Examples are shown below, and the present invention will be described in detail, but the present invention is not limited to these Examples at all.

[Evaluation Methods]

(1) Average Sphericity of Carbon-Containing Alumina Powder

As described in the above microscopy, a particle image taken using a scanning electron microscope (SEM) (Model JSM-6301F manufactured by JEOL Ltd.) was taken into an image analyzer ("MacView" (trade name) manufactured by Mountech Co., Ltd.), and the projected area (A) and the perimeter (PM) of each particle of the carbon-containing alumina particles (the projected area equivalent circle diameter as determined by microscopy was 1 μm or more and 100 μm or less) obtained in the Examples and the Comparative Examples were measured from the photograph for 200 particles arbitrarily selected. These values were used to determine the sphericities of the individual particles and the proportions thereof, and the arithmetic mean value of the sphericities of the individual particles was taken as the average sphericity.

(2) Specific Surface Area

Measurement of the specific surface area is a value based on the BET method, and specific surface area measuring instrument "Macsorb HM model-1208 (trade name)" manufactured by Mountech Co., Ltd. was used and 1.0 g of each of the carbon-containing alumina particles obtained in the Examples and the Comparative Examples was used to measure the specific surface area ($m^2/g$) by the BET one-point method. Prior to the measurement, each of the carbon-containing alumina particles obtained in the Examples and the Comparative Examples was heated at 300° C. and for 5 minutes in a nitrogen gas atmosphere as a pretreatment. In addition, in the BET measurement, a mixed gas of 30% nitrogen and 70% helium was used as an adsorption gas, and the flow rate was adjusted such that the indicated value of the main body flowmeter was 25 ml/min.

(3) Ratio B/A of Carbon Content Ratio A and Carbon Content Ratio B in Carbon-Containing Alumina Powder First, the amount of carbon in the carbon-containing alumina powder was measured using a carbon/sulfur simultaneous analyzer (Model CS-444LS (trade name) manufactured by LECO Corporation), and the carbon content ratio A was quantified by a calibration curve method. Specifically, a calibration curve was determined using a carbon steel having a known carbon content as a standard substance, then each of the carbon-containing alumina powders obtained in Examples and Comparative Examples was oxidatively burned together with an iron powder and a tungsten powder as a combustion improver in an oxygen atmosphere until the alkoxysilane compound was completely degraded and all carbon was converted to $CO_2$, and the amount of $CO_2$ generated was measured using an infrared detector to determine the carbon content ratio A.

Subsequently, 3 g of each of the carbon-containing alumina powders obtained in the Examples and the Comparative Examples was cleaned twice using 50 mL of acetone at room temperature (25° C.) for 5 minutes each and held at 100° C. for 240 minutes to obtain an alumina powder. The amount of carbon in this alumina powder was measured using a carbon/sulfur simultaneous analyzer (Model CS-444LS (trade name) manufactured by LECO Corporation), and the carbon content ratio B was quantified by a calibration curve method. The measurement by the calibration curve method was carried out by the same method as described above.

The ratio B/A was calculated using the carbon content ratio A and the carbon content ratio B obtained.

(4) Mass Ratio MSi/MC

For the mass ratio MSi/MC of the silicon atom and the carbon atom, 0.1 g of each of the carbon-containing alumina particles obtained in the Examples and the Comparative Examples was measured using an energy dispersive X-ray analyzer (EDX) (tabletop microscope Miniscope TM3030Plus manufactured by Hitachi High-Technologies Corporation) under a range of conditions of an acceleration voltage of 15 kV, an energy range of 10 to 40 keV, a number of channels of 1024 to 4096, and a spectrum acquisition of 20 sec, and from the count ratios of C and Si on the particle surface, the mass ratio of each was calculated to determine the mass ratio MSi/MC.

(5) Viscosity

Each of the carbon-containing alumina powders obtained in the Examples and the Comparative Examples left to stand for one day (filling ratio of alumina powder: 87.9% by mass) was placed in a silicone rubber A liquid (vinyl group-containing polymethylsiloxane, YE5822A Liquid (trade name) manufactured by Momentive Performance Materials Japan LLC) and mixed using a stirrer (NZ-1100 (trade name) manufactured by Tokyo Rikakikai Co., Ltd.), and vacuum defoamed to obtain a composition. The viscosity (Pas) of the obtained composition was determined using a Brookfield type viscometer model (TVB-10 (trade name) manufactured by Toki Sangyo Co., Ltd.). The viscosity was measured using a No. 7 spindle at a rotation speed of 20 rpm and a room temperature of 20° C.

(6) Thermal Conductivity

Each of the carbon-containing alumina powders obtained in the Examples and the Comparative Examples, a reaction retarder (dimethyl maleate, manufactured by Kanto Chemical Co., Inc.), and a silicone rubber B liquid (including YE5822B Liquid (trade name) manufactured by Momentive Performance Materials Japan LLC, a crosslinking agent, and the like) were sequentially placed in a silicone rubber A liquid (vinyl group-containing polymethylsiloxane, YE5822A Liquid (trade name) manufactured by Momentive Performance Materials Japan LLC), stirred, and then subjected to defoaming treatment to obtain a sample in the form of a slurry. The blending ratio thereof was calculated by adding each of the alumina powders obtained in the Examples and the Comparative Examples in the maximum amount of filling allowing hot forming, to a liquid obtained by adding 0.01 parts by mass of a reaction retarder to 100 parts by mass of a silicone rubber mixed liquid obtained by mixing 10 parts by volume of the silicone rubber A liquid with 1 part by volume of the silicone rubber B liquid, and was the proportion shown in Table 1.

TABLE 1

| Sample | Blending proportion (% by mass) |
|---|---|
| Silicone rubber A liquid | 11.0 |
| Silicone rubber B liquid | 1.1 |
| Carbon-containing spherical alumina powder | 87.9 |
| Reaction retarder | (Mass of silicone rubber A liquid + mass of silicone rubber B liquid) × 0.01 parts by mass |

After that, the obtained sample in the form of a slurry was poured into a mold provided with a recess having a diameter of 28 mm and a thickness of 3 mm, degassed, and then hot formed at 150° C. for 20 minutes. The obtained formed article was sandwiched between a copper heater case of 15 mm×15 mm and a copper plate, and set at a tightening torque of 5 kgf/cm. After that, an electric power of 15 W was applied to the copper heater case and held for 4 minutes, the temperature difference between the copper heater case and the copper plate was measured, and the thermal resistance was calculated by the following expression.

Thermal resistance (° C./W)=temperature difference between copper heater case and copper plate (° C.)/heater electric power (W)

Next, the thermal resistance (° C./W), the heat transfer area [copper heater case area] ($m^2$), and the formed body thickness (m) in the case of a tightening torque of 5 kgf/cm were used to calculate the thermal conductivity from the following expression. That is, the thermal conductivity is a value at the time of filling with each of the carbon-containing alumina powders obtained in the Examples and the Comparative Examples in the maximum amount of filling allowing hot forming. As a thermal conductivity measuring instrument, model ARC-TC-1 (trade name) manufactured by AGNE Gijutsu Center Inc., was used.

Thermal conductivity (W/m·K)=formed body thickness (m)/{heat resistance (° C./W)×heat transfer area (m$^2$)}

Example 1

0.5 Parts by mass of hexyltrimethoxysilane (KBM-3063 manufactured by Shin-Etsu Chemical Co., Ltd.) as an alkoxysilane compound, 0.5 parts by mass of methanol, and 0.1 parts by mass of water were mixed in the order presented, and the resulting mixture was stirred at room temperature for 2 days to prepare a hydrolyzed liquid.

Next, 1.0 part by mass of the hydrolyzed liquid was added to 100 parts by mass of an alumina powder having an average particle diameter of 45 μm (DAW-45 (trade name) manufactured by Denka Company Limited, average sphericity of an alumina particle having a projected area equivalent circle diameter of 1 μm or more and 100 μm or less as determined by microscopy: 0.90, specific surface area: 0.2 m$^2$/g), and then these were mixed and stirred using a mixer (EL-1 (trade name) manufactured by Nippon Eirich Co., Ltd.) for about 5 minutes and left to stand at room temperature for one day.

After that, the mixture was heat-treated at a relative humidity at room temperature (25° C.) of 50% and a temperature of 140° C. for 1.0 hour to obtain a carbon-containing alumina powder including a carbon-containing alumina particle. The physical properties of the carbon-containing alumina particle and the carbon-containing alumina powder obtained were evaluated. Results thereof are shown in Table 2.

Example 2

A carbon-containing alumina powder including a carbon-containing alumina particle was obtained in the same manner as in Example 1 except that the relative humidity and the heating temperature were changed as shown in Table 2. The physical properties of the carbon-containing alumina particle and the carbon-containing alumina powder obtained were evaluated. Results thereof are shown in Table 2.

Example 3

A carbon-containing alumina powder including a carbon-containing alumina particle was obtained in the same manner as in Example 1 except that N-decyltrimethoxysilane (KBM-3103C (trade name) manufactured by Shin-Etsu Chemical Co., Ltd.) was used instead of hexyltrimethoxysilane as an alkoxysilane compound, and the relative humidity and the heating temperature were changed as shown in Table 2. The physical properties of the carbon-containing alumina particle and the carbon-containing alumina powder obtained were evaluated. Results thereof are shown in Table 2.

Example 4

A carbon-containing alumina powder including a carbon-containing alumina particle was obtained in the same manner as in Example 1 except that dimethyldimethoxysilane (KBM-22 (trade name) manufactured by Shin-Etsu Chemical Co., Ltd.) was used instead of hexyltrimethoxysilane as an alkoxysilane compound, and the relative humidity and the heating temperature were changed as shown in Table 2. The physical properties of the carbon-containing alumina particle and the carbon-containing alumina powder obtained were evaluated. Results thereof are shown in Table 2.

Example 5

A carbon-containing alumina powder including a carbon-containing alumina particle was obtained in the same manner as in Example 1 except that an alumina powder having an average particle diameter of 3 μm (DAW-03 (trade name) manufactured by Denka Company Limited, average sphericity of an alumina particle having a projected area equivalent circle diameter of 1 μm or more and 100 μm or less as determined by microscopy: 0.90, specific surface area: 0.7 m$^2$/g) was used instead of DAW-45 (trade name) manufactured by Denka Company Limited as an alumina powder, and the relative humidity and the heating temperature were changed as shown in Table 2. The physical properties of the carbon-containing alumina particle and the carbon-containing alumina powder obtained were evaluated. Results thereof are shown in Table 2.

Example 6

A carbon-containing alumina powder including a carbon-containing alumina particle was obtained in the same manner as in Example 1 except that an alumina powder having an average particle diameter of 90 μm (DAW-90 (trade name) manufactured by Denka Company Limited, average sphericity of an alumina particle having a projected area equivalent circle diameter of 1 μm or more and 100 μm or less as determined by microscopy: 0.90, specific surface area: 0.06 m$^2$/g) was used instead of DAW-45 (trade name) manufactured by Denka Company Limited as an alumina powder, and the relative humidity and the heating temperature were changed as shown in Table 2. The physical properties of the carbon-containing alumina particle and the carbon-containing alumina powder obtained were evaluated. Results thereof are shown in Table 2.

Example 7

First, Alumina LS-21 (trade name) manufactured by Nippon Light Metal Co., Ltd. was melted, cooled, and pulverized in an arc furnace to prepare a pulverized fused alumina product. The pulverization treatment was carried out using a ball mill, and an alumina ball was used as a pulverization medium. The obtained pulverized alumina product was subjected to classification treatment to prepare an alumina powder (average particle diameter: 0.2 μm, average sphericity of an alumina particle having a projected area equivalent circle diameter of 1 μm or more and 100 μm or less as determined by microscopy: 0.75, specific surface area: 0.2 m$^2$/g).

Subsequently, the obtained alumina powder and an alumina powder having an average particle diameter of 45 μm (DAW-45 (trade name) manufactured by Denka Company Limited, average sphericity of an alumina particle having a projected area equivalent circle diameter of 1 μm or more and 100 μm or less as determined by microscopy: 0.90, specific surface area: 0.2 m$^2$/g) were appropriately mixed to obtain an alumina powder. A carbon-containing alumina powder including a carbon-containing alumina particle was obtained in the same manner as in Example 1 except that the alumina powder previously obtained was used and the relative humidity and the heating temperature were changed as shown in Table 2. The physical properties of the carbon-containing alumina particle and the carbon-containing alumina powder obtained were evaluated. Results thereof are shown in Table 2.

Comparative Example 1

A carbon-containing alumina powder including a carbon-containing alumina particle was obtained in the same manner as in Example 1 except that an alumina powder having an average particle diameter of 120 μm (DAW-120 (trade name) manufactured by Denka Company Limited, average sphericity of an alumina particle having a projected area equivalent circle diameter of 1 μm or more and 100 μm or less as determined by microscopy: 0.90, specific surface area: 0.03 m$^2$/g) was used instead of DAW-45 (trade name) manufactured by Denka Company Limited as an alumina powder, and the relative humidity and the heating temperature were changed as shown in Table 3. The physical properties of the carbon-containing alumina particle and the carbon-containing alumina powder obtained were evaluated. Results thereof are shown in Table 3.

Comparative Example 2

A carbon-containing alumina powder including a carbon-containing alumina particle was obtained in the same manner as in Example 1 except that an alumina powder having an average particle diameter of 1 μm (DAW-01 (trade name) manufactured by Denka Company Limited, average sphericity of an alumina particle having a projected area equivalent circle diameter of 1 μm or more and 100 μm or less as determined by microscopy: 0.90, specific surface area: 1.2 m$^2$/g) was used instead of DAW-45 (trade name) manufactured by Denka Company Limited as an alumina powder, and the relative humidity and the heating temperature were changed as shown in Table 3. The physical properties of the carbon-containing alumina particle and the carbon-containing alumina powder obtained were evaluated. Results thereof are shown in Table 3.

Comparative Example 3

First, Alumina LS-21 (trade name) manufactured by Nippon Light Metal Co., Ltd. was melted, cooled, and pulverized in an arc furnace to prepare a pulverized fused alumina product. The pulverization treatment was carried out using a ball mill, and an alumina ball was used as a pulverization medium. The obtained pulverized alumina product was subjected to classification treatment to prepare an alumina powder (average particle diameter: 0.2 μm, average sphericity of an alumina particle having a projected area equivalent circle diameter of 1 μm or more and 100 μm or less as determined by microscopy: 0.75, specific surface area: 0.2 m$^2$/g).

Subsequently, the obtained alumina powder and an alumina powder having an average particle diameter of 45 μm (DAW-45 (trade name) manufactured by Denka Company Limited, average sphericity of an alumina particle having a projected area equivalent circle diameter of 1 μm or more and 100 μm or less as determined by microscopy: 0.90, specific surface area: 0.2 m$^2$/g) were appropriately mixed to obtain an alumina powder. A carbon-containing alumina powder including a carbon-containing alumina particle was obtained in the same manner as in Example 1 except that the alumina powder previously obtained was used and the relative humidity and the heating temperature were changed as shown in Table 3. The physical properties of the carbon-containing alumina particle and the carbon-containing alumina powder obtained were evaluated. Results thereof are shown in Table 3.

Comparative Example 4

A carbon-containing alumina powder including a carbon-containing alumina particle was obtained in the same manner as in Example 1 except that the relative humidity was changed from 50% to 15%. The physical properties of the carbon-containing alumina particle and the carbon-containing alumina powder obtained were evaluated. Results thereof are shown in Table 3.

Comparative Example 5

A carbon-containing alumina powder including a carbon-containing alumina particle was obtained in the same manner as in Example 1 except that the relative humidity was changed from 50% to 70%. The physical properties of the carbon-containing alumina particle and the carbon-containing alumina powder obtained were evaluated. Results thereof are shown in Table 3.

Comparative Example 6

A carbon-containing alumina powder including a carbon-containing alumina particle was obtained in the same manner as in Example 1 except that the heating temperature was changed from 140° C. to 80° C. The physical properties of the carbon-containing alumina particle and the carbon-containing alumina powder obtained were evaluated. Results thereof are shown in Table 3.

Comparative Example 7

A carbon-containing alumina powder including a carbon-containing alumina particle was obtained in the same manner as in Example 1 except that the heating temperature was changed from 140° C. to 170° C. The physical properties of the carbon-containing alumina particle and the carbon-containing alumina powder obtained were evaluated. Results thereof are shown in Table 3.

Comparative Example 8

A carbon-containing alumina powder including a carbon-containing alumina particle was obtained in the same manner as in Example 1 except that the heating time was changed from 1.0 hour to 0.3 hours. The physical properties of the carbon-containing alumina particle and the carbon-containing alumina powder obtained were evaluated. Results thereof are shown in Table 3.

Comparative Example 9

A carbon-containing alumina powder including a carbon-containing alumina particle was obtained in the same manner as in Example 1 except that the heating time was changed from 1.0 hour to 2.0 hours. The physical properties of the carbon-containing alumina particle and the carbon-containing alumina powder obtained were evaluated. Results thereof are shown in Table 3.

TABLE 2

|  |  | Examples | | | | | | |
| --- | --- | --- | --- | --- | --- | --- | --- | --- |
|  |  | 1 | 2 | 3 | 4 | 5 | 6 | 7 |
| Production conditions | | | | | | | | |
| Relative humidity | % | 50 | 30 | 30 | 30 | 30 | 30 | 30 |
| Heating temperature | °C. | 140 | 110 | 130 | 130 | 130 | 130 | 130 |
| Heating time | hr | 1.0 | 1.0 | 1.0 | 1.0 | 1.0 | 1.0 | 1.0 |
| Evaluation results | | | | | | | | |
| Average sphericity | — | 0.90 | 0.90 | 0.90 | 0.90 | 0.90 | 0.90 | 0.85 |
| Specific surface area | m²/g | 0.2 | 0.2 | 0.2 | 0.2 | 0.7 | 0.06 | 0.2 |
| Ratio B/A | — | 0.90 | 0.30 | 0.52 | 0.51 | 0.49 | 0.53 | 0.53 |
| Mass ratio MSi/MC | — | 0.4 | 0.4 | 0.2 | 1.2 | 0.4 | 0.4 | 0.4 |
| Viscosity | Pa·s | 59 | 41 | 43 | 52 | 48 | 52 | 51 |
| Thermal conductivity | W/mK | 3.5 | 3.6 | 3.5 | 3.5 | 3.5 | 3.3 | 3.5 |

TABLE 3

|  |  | Comparative Examples | | | | | | | | |
| --- | --- | --- | --- | --- | --- | --- | --- | --- | --- | --- |
|  |  | 1 | 2 | 3 | 4 | 5 | 6 | 7 | 8 | 9 |
| Production conditions | | | | | | | | | | |
| Relative humidity | % | 30 | 30 | 30 | 15 | 70 | 50 | 50 | 50 | 50 |
| Heating temperature | °C. | 130 | 130 | 130 | 140 | 140 | 80 | 170 | 140 | 140 |
| Heating time | hr | 1.0 | 1.0 | 1.0 | 1.0 | 1.0 | 1.0 | 1.0 | 0.3 | 2.0 |
| Evaluation results | | | | | | | | | | |
| Average sphericity | — | 0.90 | 0.90 | 0.82 | 0.90 | 0.90 | 0.9 | 0.9 | 0.9 | 0.9 |
| Specific surface area | m²/g | 0.03 | 1.2 | 0.2 | 0.2 | 0.2 | 0.2 | 0.2 | 0.2 | 0.2 |
| Ratio B/A | — | 0.49 | 0.48 | 0.51 | 0.14 | 0.98 | 0.13 | 0.96 | 0.11 | 0.94 |
| Mass ratio MSi/MC | — | 0.4 | 0.4 | 0.4 | 0.4 | 0.4 | 0.4 | 0.4 | 0.4 | 0.4 |
| Viscosity | Pa·s | 80 | 165 | 186 | 126 | 100 | 129 | 102 | 120 | 103 |
| Thermal conductivity | W/mK | 2.8 | 2.8 | 2.9 | 3.2 | 3.1 | 3.2 | 3.1 | 3.2 | 3.1 |

The present application is based on a Japanese patent application filed on Mar. 31, 2020 (Japanese Patent Application No. 2020-064175), the contents of which are incorporated herein by reference.

INDUSTRIAL APPLICABILITY

The carbon-containing alumina powder according to the present embodiment and the resin composition using this alumina powder can be applied to various applications, and are suitable for a heat dissipation component such as a heat dissipation sheet, a heat dissipation grease, a heat dissipation spacer, a semiconductor encapsulant, a heat dissipation coating material (heat dissipation coating agent), a heat dissipation potting agent, and a heat dissipation gap filler. In addition, these heat dissipation components can be suitably used for a personal computer, an automobile, a portable electronic device, a household electric appliance, and the like.

The invention claimed is:

1. A carbon-containing alumina powder comprising a carbon-containing alumina particle having a projected area equivalent circle diameter of 1 µm or more and 100 µm or less as determined by microscopy, wherein
an average sphericity of the carbon-containing alumina particle is 0.85 or more, and a specific surface area is 0.05 m²/g or more and 1.0 m²/g or less, and
a ratio B/A of a carbon content ratio B to a carbon content ratio A in the carbon-containing alumina powder calculated by using the following measurement method is 0.20 or more and 0.90 or less: (Measurement method) the ratio B/A is calculated by using the carbon content ratio A in the carbon-containing alumina powder, and the carbon content ratio B in the alumina powder after 3 g of the carbon-containing alumina powder is cleaned twice using 50 mL of acetone at room temperature for 5 minutes each and held at 100° C. for 240 minutes, wherein each of the carbon content ratio A and the carbon content ratio B is a value measured using a carbon/sulfur simultaneous analyzer.

2. The carbon-containing alumina powder according to claim 1, wherein the carbon-containing alumina powder comprises a silicon atom and a carbon atom, and a ratio MSi/MC of a mass MSi of the silicon atom to a mass MC of the carbon atom is 0.1 or more and 1.2 or less.

3. A resin composition comprising a resin and the carbon-containing alumina powder according to claim 1.

4. A heat dissipation component comprising the carbon-containing alumina powder according to claim 1.

5. A method for producing the carbon-containing alumina powder according to claim 1, the method comprising:
a step of mixing an alkoxysilane compound and an alumina powder; and
a step of heating these at a relative humidity at room temperature of 20% or more and 60% or less, a temperature of 100° C. or more and 150° C. or less, and a heating time of 0.5 hours or more and 1.5 hours or less.

6. A resin composition comprising a resin and the carbon-containing alumina powder according to claim 2.

7. A heat dissipation component comprising the carbon-containing alumina powder according to claim 2.

8. A method for producing the carbon-containing alumina powder according claim 2, the method comprising:
- a step of mixing an alkoxysilane compound and an alumina powder; and
- a step of heating these at a relative humidity at room temperature of 20% or more and 60% or less, a temperature of 100° C. or more and 150° C. or less, and a heating time of 0.5 hours or more and 1.5 hours or less.

9. A heat dissipation component comprising the resin composition according to claim 3.

* * * * *